US006878400B2

(12) United States Patent
Colombo et al.

(10) Patent No.: US 6,878,400 B2
(45) Date of Patent: Apr. 12, 2005

(54) METHOD AND APPARATUS FOR INTRODUCING IN CONTINUOUS A SUBSTANCE IN LIQUID PHASE INTO PLASTICS GRANULES

(75) Inventors: Giuseppe Colombo, Capriate (IT); Pierluigi Folcini, Olgiate Olona (IT); Giovanni Pozzati, Sens (FR); Marcello Del Brenna, Elizabeth Bay (AU)

(73) Assignee: Pirelli Cavi e Sistemi S.p.A., Milan (IT)

(*) Notice: Subject to any disclaimer, the term of this patent is extended or adjusted under 35 U.S.C. 154(b) by 0 days.

(21) Appl. No.: 09/892,480

(22) Filed: Jun. 28, 2001

(65) Prior Publication Data

US 2002/0046700 A1 Apr. 25, 2002

Related U.S. Application Data

(63) Continuation of application No. PCT/EP99/10258, filed on Dec. 20, 1999.
(60) Provisional application No. 60/114,534, filed on Dec. 31, 1998.

(30) Foreign Application Priority Data

Dec. 29, 1998 (EP) .............................. 98204456

(51) Int. Cl.[7] .................. B05D 7/00; B05C 11/02; B01F 5/06
(52) U.S. Cl. .................... 427/212; 427/213; 427/213.3; 427/213.31; 427/222; 427/242; 427/372.2; 427/384; 427/385.5; 427/393.5; 427/421; 427/422; 427/424; 118/56; 118/57; 118/58; 118/300; 118/303; 118/313; 118/315; 118/316; 118/DIG. 5; 366/336; 366/341; 366/173.2

(58) Field of Search .................. 427/212, 213, 427/222, 213.3, 213.31, 242, 372.2, 384, 385.5, 393.5, 421, 422, 424; 118/56, 57, 58, 300, 303, 313, 315, 316, DIG. 5; 366/336, 341, 173.2

(56) References Cited

U.S. PATENT DOCUMENTS

| 3,880,803 | A | * | 4/1975 | Keizer | 524/151 |
| 3,988,296 | A | * | 10/1976 | Bethea et al. | 524/371 |
| 4,035,322 | A | * | 7/1977 | Tate et al. | 524/87 |
| 4,191,480 | A | * | 3/1980 | Hiorth | 366/336 |
| 5,076,988 | A | * | 12/1991 | Rifi | 264/211 |
| 6,186,658 | B1 | * | 2/2001 | Nishida et al. | 366/173.2 |

FOREIGN PATENT DOCUMENTS

DE  19 40 907  8/1969

* cited by examiner

*Primary Examiner*—Elena Tsoy
(74) *Attorney, Agent, or Firm*—Finnegan, Henderson, Farabow, Garrett & Dunner, L.L.P.

(57) ABSTRACT

A method for continuously introducing a substance in liquid phase into plastics granules comprising: a) feeding a substantially continuous flow of the plastics granules to at least one substantially static spraying chamber, b) spraying the substance in liquid phase onto the plastics granules, c) passing the granules partially or totally coated by the substance in liquid phase by a substantially static mixing means supported in at leas one mixing chamber provided downstream of the spraying chamber, d) submitting the mixed granules to drying for a time sufficient to allow a substantially complete absorption of the substance in liquid phase by the granules.

13 Claims, 8 Drawing Sheets

METHOD AND APPARATUS FOR INTRODUCING IN CONTINUOUS A SUBSTANCE IN LIQUID PHASE INTO PLASTICS GRANULES

CROSS REFERENCE TO RELATED APPLICATIONS

This application is a continuation of International Application No. PCT/EP99/10258 filed Dec. 20, 1999, which is incorporated by reference herein and claims the priority of EP98 204 456.2, filed Dec. 29, 1998, and the benefit of U.S. Provisional application No. 60/114,534, filed Dec. 31, 1998, which is incorporated by reference herein.

DESCRIPTION

1. Field of Application

In a first aspect thereof, the present invention relates to a method for introducing in continuous a substance in liquid phase into plastics granules.

The invention also relates to an apparatus for impregnating in continuous plastics granules by means of the aforesaid method.

2. Prior Art

As is known, during plastics processing, it is common practice to incorporate therein suitable substances in liquid phase, such as for example cross-linking agents, additives, etc., adapted to impart to the finished product specific chemical-physical, mechanical or processing properties otherwise not obtainable from the starting plastics.

Generally, such substances in liquid phase are incorporated into the plastics granules by forming a thin film of liquid on the surface of the granules and then allowing the granules to rest or "dry" for a predetermined time, so as to allow the absorption of the substance due to its diffusion within the granules.

In various fields of industrial interest wherein plastics are used, and in particular in the field of electric cables manufacturing, the need arises to manufacture layers or elements made of plastics having physical-mechanical characteristics which are as isotropic as possible.

In particular, such isotropy and homogeneity of constitution is to be achieved also in the presence of optional additives, such as for example cross-linking agents, antioxidants, light stabilizers, UV stabilizers, plasticizers, etc. incorporated in the plastics during the productive cycle in order to impart the desired characteristics to the final layer or element.

Thus, for example, in the case of electric cables manufacturing, the need has been felt for a long time of realizing insulating and/or semiconducting layers of the cable as homogeneous and isotropic as possible in terms of composition, in such a way as to have satisfactory warm performances of the insulating or semiconducting layer, both from the mechanical and the electrical point of view.

In particular, in the case of cables for transmitting current at high or very high voltage, the isotropy and homogeneity of constitution of the insulating layer allows to obtain the high values of dielectric strength required for the optimal operation of the cable itself.

At present, such insulating layer is obtained by extruding plastics, for example polyethylene, previously impregnated with a cross-linking agent, for example dicumylperoxide, and by subsequently cross-linking the plastics so impregnated.

In this case, obtaining a layer of insulating material having the desired homogeneity and isotropy of constitution is strongly conditioned by the distribution of the cross-linking agent within the plastics granules used for manufacturing the insulating layer of the cable. In turn, the homogeneity and isotropy of constitution of the insulating and semiconducting layers of the cable determine, for practical purposes, the overall quality of the cable itself, which may also be affected by a single minimum defect (for example a non perfect homogeneity or anisotropy of constitution) locally present in the layer under consideration.

At present, the introduction of substances in liquid phase into plastics granules is carried out by means of a set of working steps carried out by submitting to mechanical mixing the granules to be impregnated, such as described in U.S. Pat. No. 4,522,957.

In particular, in a first working step the substance in liquid phase, for example a cross-linking agent, is sprayed onto the plastics granules submitted to mechanical mixing within a rotating drum at a temperature higher than the melting temperature of the aforesaid substance but lower than the softening temperature of the plastics, in such a way as to avoid an undesired sticking of the plastics granules in this first step; in a second working step, the granules impregnated with the aforesaid substance are again submitted to mechanical mixing within a second rotating drum—always at a temperature lower than the softening temperature of the plastics—in order to allow a more homogeneous distribution of the substance in liquid phase on the granules surface.

Additionally, in order to promote the absorption of the cross-linking agent by the impregnated granules, thus obtaining plastics granules substantially dry on the outer surface, the latter are submitted to a third working step of cold mixing.

Although substantially achieving the intended purpose, nevertheless the aforesaid impregnation method presents the not negligible drawback related to the generation of plastics dust due to the mechanical mixing which the plastics granules are submitted to.

The presence of such dust, in fact, cannot be tolerated in the subsequent working steps since it preferentially absorbs the liquid (cross-linking agent) because of the high surface area/volume ratio that dusts and finely subdivided materials have, and involves the double risk of a non homogeneous cross-linking of the final layer (with prejudice of its characteristics of isotropy and constitutional homogeneity) and of a premature cross-linking in the extrusion apparatuses.

While carrying out the impregnating operations according to the teachings of U.S. Pat. No. 4,522,957, therefore, the need arises of providing an additional step of dust removal at the end of the mixing and impregnating steps and before the final layer formation step. Whatever accurate the removing step (generally carried out by means of screening) may be, however, traces of dusty plastics remain as residue, which affect, in a substantially not eliminable way, the characteristics of isotropy and structural homogeneity of the layer obtained after cross-linking.

As alternative to this impregnating method, it has been suggested to use continuous (twin-screw type) or discontinuous (Banbury type) mixers, which are adapted to plasticize the granules in a mass of plastics in which the desired additives, always by means of mechanical mixing, are incorporated.

This second impregnating procedure, however, is difficult to be carried out both with oily liquids (because of the lubricating effect on the moving elements of the mixer) and with thermally unstable or poorly heat-resistant additives or plastics (because of the high temperatures reached by the mass of plastics during the mixing operations).

SUMMARY OF THE INVENTION

The technical problem underlying the present invention is therefore that of providing a method and an apparatus for introducing a substance in liquid phase into plastics granules which allow both to protect the physical integrity of the granules, avoiding in particular the generation of plastics dust, and to operate with thermally unstable or poorly heat-resistant plastics or substances in liquid phase.

According to a first aspect of the invention, the aforesaid technical problem is solved by a method for introducing in continuous a substance in liquid phase into plastics granules, comprising the steps of:

a) feeding a substantially continuous flow of said plastics granules to a substantially static spraying chamber, b) spraying said substance in liquid phase onto the plastics granules continuously flowing within said spraying chamber, c) passing the granules partially or totally coated by said substance in liquid phase continuously leaving the spraying chamber, through substantially static mixing means supported in at least one mixing chamber provided downstream of said spraying chamber, so as to submit said granules to mixing, d) submitting the mixed granules so obtained to drying for a time sufficient to allow a substantially complete absorption of the substance in liquid phase by the granules.

In the following description and in the subsequent claims the terms: "substantially static mixing means" indicate mixing means not provided with moving mechanical elements adapted to produce substantial amounts of plastics dust by rubbing. Preferably, the substantially static means of the invention are fixed within the mixing chamber.

Thanks to such working steps, the plastics granules may be coated with the substance in liquid phase and subsequently submitted to mixing without additional energy being supplied by moving mechanical means which are dynamically acting on the mass of granules, so as to reduce to a minimum the abrasive action on the granules and avoid in a substantially complete manner the noxious generation of plastics dust.

Advantageously, furthermore, thanks to the fact that the above mentioned granules are treated in a substantially continuous manner, it is possible to obtain impregnated granules having constant and statistically homogeneous characteristics therebetween.

Preferably, the drying step of the coated granules is carried out in a drying chamber provided downstream of said at least one mixing chamber.

In a preferred embodiment of the method according to the invention, it is possible to reduce down to a minimum the mechanical rubbing on the plastics granules, by flowing the latter by gravity and in a substantially continuous manner:

through the spraying chamber wherein the granules are sprayed with the substance in liquid phase;

through the mixing chamber provided downstream of the spraying chamber, wherein the granules are mixed by substantially static means, so as to distribute as uniformly as possible the substance in liquid phase on the granules; and through the drying chamber provided downstream of the mixing chamber, wherein the absorption of the substance in liquid phase by the plastics granules takes place.

Advantageously, the residence time in the drying chamber is set in such a way as to have substantially dried granules at the end of the aforesaid spraying, mixing and drying steps.

Preferably, the spraying step of the substance in liquid phase is carried out by means of a plurality of injectors supported within said spraying chamber.

In particular, such injectors are commercially available and known per se and may be for example of the hole-type or of the throttled pin-type.

Preferably, the spraying step is carried out by means of the aforesaid injectors, by intermittently injecting the substance in liquid phase at an injection frequency comprised between 500 and 2000 strikes/min and at an injection pressure comprised between 100 and 300 bar depending on the type of injector used.

Advantageously, the use of a high value of injection frequency allows to subdivide the sprayed substance in liquid phase in a high number of microdroplets and hence to distribute the same in a substantially continuous manner over the time on the surface of the granules; furthermore, the high injection pressure, in combination with the high injection frequency allows to have a very good jet nebulization and hence a good distribution of the substance in liquid phase already during the spraying step.

Preferably, the spraying step is carried out by nebulizing the substance in liquid phase in a plurality of droplets having a mean diameter comprised between 10 and 500 $\mu$m.

In a preferred embodiment, the method according to the invention further comprises the step of splitting the continuous flow of plastics granules in a plurality of streams continuously flowing in respective flowpaths defined within the spraying chamber and facing each of said injectors.

Advantageously, in this way, the effectiveness of the distribution of the substance in liquid phase nebulized onto the granules is increased, thanks to the increase of the number of granules that may be struck by the jet produced by each injector within each of the aforesaid flowpaths.

For the purposes of the invention, steps a)–d) are carried out at a temperature which allows both to promote the diffusion of the substance within the granules obtaining an uniform distribution thereof, and to keep in the liquid state the substance to be incorporated in the granules throughout all the method steps, a feature which is of particular importance in case of substances that are solid at room temperature, such as for instance dicumylperoxide.

As far as the choice of the process temperature is concerned, it should be borne in mind that such process temperature should be higher or equal to the melting temperature of the additive, if the latter is solid at room temperature, and at the same time lower than the minimum temperature between the softening temperature of the polymer to be impregnated and the temperature at which the additive starts to thermally deteriorate.

In fact, if the process temperature is higher than the softening temperature of the polymer, an undesired packing of the granules would take place within the apparatus during the working steps of impregnation, which would remarkably affect the possibility of obtaining impregnated granules.

On the other hand, if the process temperature is higher than the temperature of thermal degradation of the additive, undesired reactions could be triggered within the impregnating apparatus.

Compatibly with the above disclosed general and safety conditions, specific of each additive, it is anyway preferable to work at the highest possible temperature, in order to promote the diffusion of the additive within the plastics and to suitably reduce the liquid viscosity, thus facilitating the feed and the injection of the liquid.

In this connection, it is preferable to set the process temperature in such a way that the viscosity of the substance in liquid phase is comprised between $1*10^{-6}$ m$^2$/s (1 cSt) and $50*10^{-6}$ m$^2$/s (50 cSt); in fact, a viscosity value below $1*10^{-6}$ m$^2$/s could involve seizure problems in the injecting heads, whereas a viscosity value higher than $50*10^{-6}$ m$^2$/s could involve feeding problems of the substance in liquid phase to the injectors by the pump of the feeding system.

In the particular case of introducing dicumylperoxide into granules made of polyethylene, the process temperature is preferably comprised between 60° C. and 90° C., more preferably between 65° C. and 75° C., taking into account the safety problems due to the use of dicumylperoxide.

According to the invention, steps b)–d) are carried out in such a way as to obtain suitable residence times of the granules in the respective spraying, mixing and drying chambers for achieving an optimum distribution of the liquid onto the granules and a substantially complete absorption of the substance in liquid phase by the granules themselves.

Such residence times essentially depend on the plastics-additive system, being affected by the process temperature and by the diffusion characteristics of the additive within the polymer. In particular, the higher the process temperature and the greater the diffusion velocity within the granule, the lower such residence times will be.

For a preset plastics-additive system, the optimum residence times may be easily determined by a man skilled in the art, acting both on the flow rate of the granules and on the sizes of the aforesaid chambers.

From experimental tests carried out by the Applicant, it turns out to be preferable and advantageous to carry out steps b) and c) in a total time comprised between 10 and 40 minutes. In particular, it is preferable to carry out step b) in a time comprised between 5 and 30% and, still more preferably in a time equal to 10%, of the total time of the aforesaid steps b) and c), while it is preferable to carry out step c) in a time comprised between 70 and 95% and, still more preferably in a time equal to 90%, of the total time of the aforesaid steps b) and c).

From the aforesaid tests, it further ensues that it is preferable and advantageous to carry out the drying step in a time comprised between 30 and 90 minutes.

According to an embodiment of the invention, the mixing step of the granules is carried out by passing the granules partially or totally coated by the substance in liquid phase through a static mixer, comprising a substantially pyramidal central body, supported by a plurality of supporting legs at a predetermined distance from an inner wall of the aforesaid mixing chamber, and a plurality of baffles, extending between the inner wall and respective openings for the flow of the granules, defined between the supporting legs, the mixer being adapted to deviate the granules flowing in the central zone of the mixing chamber towards the peripheral zone thereof, and the granules flowing in the peripheral zone of the mixing chamber towards the central zone thereof.

By means of such static mixer, the mixing step is carried out by modifying in a statistically significant way the trajectory of the granules flowing within the mixing chamber, in particular, by deviating the portion of granules flowing in the central zone of the mixing chamber towards the peripheral zone of the same and viceversa. The granules coming from different zones of the spraying chamber provided upstream of the mixing chamber, therefore, come in contact between each other in such a way as to obtain a statistically more homogeneous distribution of the substance in liquid phase previously sprayed onto the mass of granules.

In other words, the static mixer allows to improve the distribution of the substance in liquid phase on the granules at a macroscopic level.

Preferably, the mixing step of the granules is carried out by passing the latter through at least two static mixers arranged in series one after the other.

According to an alternative embodiment, the mixing step of the granules may be carried out by passing the granules partially or totally coated by the substance in liquid phase through substantially static mixing means comprising a plurality of mixing bars supported within the aforesaid mixing chamber.

Preferably, the mixing step of the granules is carried out by passing the latter through at least two superimposed groups of mixing bars arranged substantially perpendicularly with one other.

Such mixing bars allow to carry out a statistically significant mixing between close granules and improve the distribution of the substance in liquid phase on each granule at a local level.

In a preferred embodiment of the invention, the mixing step of the granules is carried out by passing the granules partially or totally coated by the substance in liquid phase through at least one static mixer supported within a first upper mixing chamber of a mixing zone and a plurality of mixing bars supported downstream of said static mixer within a second lower mixing chamber of the mixing zone.

In this way, it is advantageously possible to carry out a mixing of the granules both at a macroscopic and at a local level, obtaining an optimum distribution of the substance in liquid phase on the granules.

Still more preferably, the distribution of the substance in liquid phase on the granules may be further improved by carrying out at least one spraying step followed by two mixing steps, the first being carried out by flowing the granules through a static mixer, the latter by flowing the granules through a static mixer and a plurality of groups of mixing bars.

In a preferred embodiment, the method of the invention further comprises the step of submitting the granules leaving the drying chamber to a soaking step in order to equalize the distribution of the substance in liquid phase inside each of the plastics granules.

Preferably, such soaking step is carried out by keeping the mass of granules leaving the drying chamber at a temperature substantially corresponding to the temperature used to carry out the previous steps of the method, which may be determined by a man skilled in the art according to the same criteria disclosed above.

Thus, for instance, if it is desired to introduce a cross-linking agent into plastics (polyolefins) commonly used for manufacturing insulating and/or semiconducting layers of electric cables, it is preferable to carry out the soaking step at a temperature comprised between 70° and 80° C., still more preferably at about 75° C. for a time comprised between 14 and 24 hours, still more preferably for about 16 hours.

Conveniently, the soaking step may be carried out by keeping the previously impregnated granules at the desired temperature and for the desired time within an apparatus conventional per se, such as for example a thermostatic storage bin.

In this way, the distribution of the substance in liquid phase within the granules is advantageously optimized, which is of particular importance in case of plastics, such as for example polyolefines, having a low absorption capacity.

According to the invention, the aforesaid impregnating method may be carried out on any plastics adapted to absorb a substance in liquid phase; preferably, the granules are made of a polymer selected from the group comprising polyolefines, such as for example high pressure and low density polyethylene (HPLDPE), mean density polyethylene (MDPE), high density polyethylene (HDPE), low pressure and linear low density polyethylene (LPLLDPE), very and ultra low density linear polyethylene, ethylene-propylene copolymers, ethylene-propylene-diene terpolymers, ethylene-vinyl acetate (EVA) copolymers, acrylic polyesters including ethylene-methyl acrylate, ethylene-ethyl acrylate, ethylene-butyl acrylate groups, and mixture thereof.

For the purposes of the invention, the substance in liquid phase may be any substance or any mixture of substances adapted to give to the finished product specific chemical-physical, mechanical or processing properties, which cannot otherwise be obtained from the starting plastics.

Preferably, the substance in liquid phase is a substance selected from the group comprising: cross-linking agents, cross-linking co-agents, thermal stabilizers, various additives, such as for example, light stabilizers, voltage stabilizers, UV stabilizers, processing aids, lubricants, flame retardants, plasticizers, nucleating agent, additives for water-treeing resistance, and mixtures thereof.

Cross-linking agents of preferred use are selected among organic peroxides suitable for the purpose, such as for example those selected from the group comprising: dicumylperoxide, butylcumylperoxide, bis (terbutylperoxyisopropyl)benzene, bis(terbutylperoxy)2,5 dimethyl hexane, bis(terbutylperoxy)2,5 dimethyl hexyne, and mixtures thereof.

Cross-linking coagents of preferred use are selected from the group comprising: triallylcyanurate, triallylisocyanurate, acrylates or diacrylates, polybutadiene having a high content of terminal vinyl groups, and mixtures thereof.

Thermal stabilizers of preferred use are selected from the group comprising: phenol-based antioxidants, amine-based antioxidants, non- or weakly spotting amine stabilizers, such as for example the so-called "HALS" (Hindered Amine Light Stabilizer), thioesters, phosphites, metal chelating agent, and mixtures thereof.

Various additives of preferred use are polar or non-polar organic substances of aromatic or aliphatic type, and are selected among the commercially available substances for the desired purpose.

According to a second aspect of the invention, the aforesaid technical problem is solved by an apparatus for introducing in continuous a substance in liquid phase into plastics granules, comprising a supporting structure adapted to support in series and in substantial vertical alignment:

- a feeding section of the plastics granules provided with means for feeding in a substantially continuous manner said granules to at least one spraying chamber provided with means for spraying said substance in liquid phase onto the plastics granules,
- at least one mixing chamber of the plastics granules partially or totally coated with said substance comprising substantially static mixing means supported in said mixing chamber,
- at least one drying chamber adapted to receive a predetermined amount of plastics granules coated with said substance in liquid phase.

Advantageously, such an apparatus allows to operate in continuous on the granules flowing within the aforesaid spraying, mixing and drying chambers simply by effect of gravity and allows to obtain a mass of impregnated granules in a statistically substantially uniform manner.

Advantageously, furthermore, the absence of moving means dynamically acting on the mass of granules in the apparatus of the invention, allows to distribute the substance in liquid phase on the granules reducing at minimum rubbing between granules which come in contact during mixing and therefore avoiding in a substantially complete way the generation of plastics dust.

Preferably, the means for feeding in a substantially continuous manner the granules comprises a dosing valve supported downstream of a storage tank of the granules.

In such a way, it is possible to keep constant the flow rate of the granules fed to the apparatus and ensure, by a suitable synchronism with a discharge valve placed downstream of the apparatus, both the complete filling of the apparatus and an adequate residence time within the same. An incomplete filling, in fact, could cause the formation of dead zones of the sprayed substance in liquid phase, in which this one would concentrate in a non-tolerable way.

Furthermore, thanks to the possibility of ensuring the complete filling of the apparatus by means of the aforesaid means for feeding and discharging the granules, the apparatus of the invention is advantageously substantially self-cleaning, i.e. substantially devoid of dead zones of the substance in liquid phase and of the granules.

According to a first embodiment of the apparatus of the invention, the means for spraying the substance in liquid phase comprises at least one injector having a nozzle supported within the aforesaid at least one spraying chamber and forming an angle $\alpha$ comprised between 90° and 45° and, still more preferably, comprised between 75° and 60° with a longitudinal axis of the spraying chamber.

The choice of such an inclination of the injector is substantially due to the fact that the Applicant has found no substantial advantages for an inclination angle $\alpha$ comprised between 45° and 0° with respect to the embodiment with vertical injectors which will be described in the following.

According to a second embodiment of the apparatus of the invention, the means for spraying the substance in liquid phase comprises at least one injector having a nozzle supported within the spraying chamber which extends parallel to a longitudinal axis of the spraying chamber.

According to an alternative embodiment, such injector may be entirely supported within the spraying chamber.

In particular, the use of an injector extending parallel to a longitudinal axis of the spraying chamber and entirely supported or having a nozzle supported within the spraying chamber, allows to distribute in a more uniform way the substance in liquid phase onto the granules flowing through the apparatus, with respect to the case of an injector inclined with respect to said longitudinal axis.

Advantageously, the means for spraying the substance in liquid phase comprises a plurality of injectors angularly offset from one another independently from the angular orientation thereof with respect to the longitudinal axis of the spraying chamber. In such a way, it is possible to improve the distribution of the substance in liquid phase on the mass of plastics granules.

Preferably, the spraying chamber comprises three coplanar injectors offset from one another by an angle of 120°; still more preferably, the spraying chamber comprises six coplanar injectors offset from one another by an angle of 60°.

In order to optimize the distribution of the substance in liquid phase on the surface of the granules, the spraying chamber further comprises a shaped insert adapted to define in the aforesaid chamber respective flowpaths of the granules facing each of said injectors.

According to an embodiment of the apparatus of the invention, the aforesaid flowpaths are defined in respective open channels axially formed in the insert, whereas the injectors inclined according to the above indicated angle α are oriented in such a way as to spray the substance in liquid phase into the channels in countercurrent to the continuous flow of the granules.

In such a way, the flow of the granules is advantageously split in a plurality of distinct streams, which independently flow in each of the aforesaid channels, increasing in a statistically significant way the number of granules exposed to the jet of the injector.

According to a further embodiment of the apparatus, the aforesaid flowpaths are defined in respective closed channels, axially formed in the insert, whereas the injectors are oriented in such a way as to spray the substance in liquid phase in the aforesaid channels in countercurrent to the continuous flow of the granules.

In particular, each of the aforesaid injectors is placed at the lower ends of each channel in such a way as to uniformly spray the substance in liquid phase on the granules flowing in the channels. Such injectors may be completely dipped in the granules flow or may be supported externally to the spraying chamber in such a way as to have only the ejection nozzle within the same.

Furthermore, in order to maximize the spraying effectiveness and to increase the possibilities of contact with the granules, the aforesaid channels are formed in such a way as to comprise opposite frustoconical end portions joined at a restricted section or throat.

In particular, the size of such restricted section is such to correspond to the maximum opening of the spraying cone of the used nozzle, in such a way as to hit as uniformly as possible the advancing front of the granules with the jet ejected by the injector below, while the lower end portion is shaped in such a way as to present an ever increasing flowing section for the granules, so as to obtain a decrease of the granules flow velocity down to a value suitable for effectively carrying out the subsequent mixing step.

According to a further embodiment of the invention, the aforesaid apparatus comprises a plurality of spraying chambers arranged in parallel with one another, defined in respective ducts extending between the feeding section and the mixing zone of the granules.

Therefore, also in this case the flow of granules-coming in continuous from the feeding section is split into a plurality of distinct streams independently flowing in each of the aforesaid ducts.

In particular, the aforesaid ducts comprise a first portion forming an angle β comprised between 30° and 60° with the longitudinal axis of the apparatus, a second portion substantially parallel to the longitudinal axis of the apparatus and a third portion forming an angle γ comprised between 30° and 60° with the longitudinal axis of the apparatus.

Still more preferably, the angle β is comprised between 40° and 50° and preferably is equal to about 45°, whereas the angle γ is comprised between 40° and 50° and preferably is equal to about 45°.

The first portion substantially constitutes a feeding channel of the granules to the real spraying chamber, which is defined in the adjacent portion extending parallel to the longitudinal axis of the apparatus.

Preferably, the apparatus of the invention comprises a plurality of injectors each having respective nozzle coaxially supported within the above mentioned spraying chambers. In particular, the aforesaid injectors are oriented in such a way as to spray the substance in liquid phase cocurrently with the continuous granules flow.

In this way, after having flown through the first portion the flow of the granules undergoes to an equalization of the velocities of each granule in the zone of junction with the second portion, in which, therefore, the flow has a substantially horizontal advancing front. Therefore, the number of granules exposed to the jet of the injector is increased in a statistically significant way.

Preferably, the substantially static mixing means provided in the mixing chamber of the apparatus comprises at least one static mixer.

In particular, such static mixer comprises a substantially pyramidal central body having respective faces, the aforesaid central body being provided with a plurality of deviating wings projecting from each face and being supported by a plurality of supporting legs at a predetermined distance from an inner wall of the mixing chamber, and a plurality of baffles extending between the inner wall and respective apertures for the flow of the granules defined between the supporting legs.

Advantageously and as will be more readily apparent hereinbelow, the above described static mixer allows to mix the granules from one another without dynamically acting thereon, deviating the granules which flow in the central zone of the spraying chamber towards the peripheral zone of the mixing chamber and viceversa.

In this way, the presence of the static mixer allows to achieve a mixing of the granules at a macroscopic level and a more uniform distribution on each granules of the substance in liquid phase with respect to that obtained upstream of the spraying chamber, avoiding in a substantially complete way the formation of plastics dust thanks to the substantial absence of rubbing between the granules and of means dynamically acting on them.

Preferably, the aforesaid substantially static mixing means comprises at least two static mixers arranged in series one after the other.

Alternatively, the aforesaid substantially static mixing means may comprise a plurality of mixing bars supported in the mixing chamber.

Preferably, the aforesaid substantially static mixing means comprises at least two superimposed groups of mixing bars arranged substantially perpendicularly with one another.

In this way, mixing at a local level of the granules coming from the spraying chamber may be improved, obtaining also in this case an improvement of the distribution of the substance in liquid phase on each of them.

In a particularly preferred embodiment, the apparatus of the present invention comprises at least one static mixer supported within a first upper substantially cylindrical mixing chamber of a mixing zone and at least two superimposed groups of mixing bars arranged substantially perpendicularly with one another and placed downstream of the static mixer within a second lower substantially frustoconical mixing chamber of the mixing zone.

In this way, it is possible to optimize mixing of the granules both at a macroscopic and at a local level, improving in a statistically significant way the distribution of the substance in liquid phase on the same granules.

Still more preferably, the apparatus of the invention comprises at least one spraying chamber and two static mixers arranged in series one after the other, while the aforesaid plurality of mixing bars is supported downstream of the last static mixer in the lower mixing chamber.

In this way, the distribution of the substance in liquid phase on the granules is globally optimized.

In a further embodiment, and always in order to optimize the distribution of the substance in liquid phase on the granules, the apparatus according to the invention may further comprise one or more groups of mixing bars in an initial zone of the drying chamber.

In an embodiment of the invention, and in order to equalize the distribution of the substance in liquid phase in each of the plastics granules, the above disclosed apparatus may further comprise a soaking zone consisting of a thermostated storage bin, conventional per se, supported downstream of the drying chamber in a way known per se.

BRIEF DESCRIPTION OF THE DRAWINGS

Additional features and advantages of the invention will be more readily apparent from the following detailed description of some preferred embodiments of the apparatus according to the present invention, made solely by way of non limitative indication, with reference to the attached drawings. In such drawings.

DETAILED DESCRIPTION OF PREFERRED EMBODIMENTS

Figure 1:
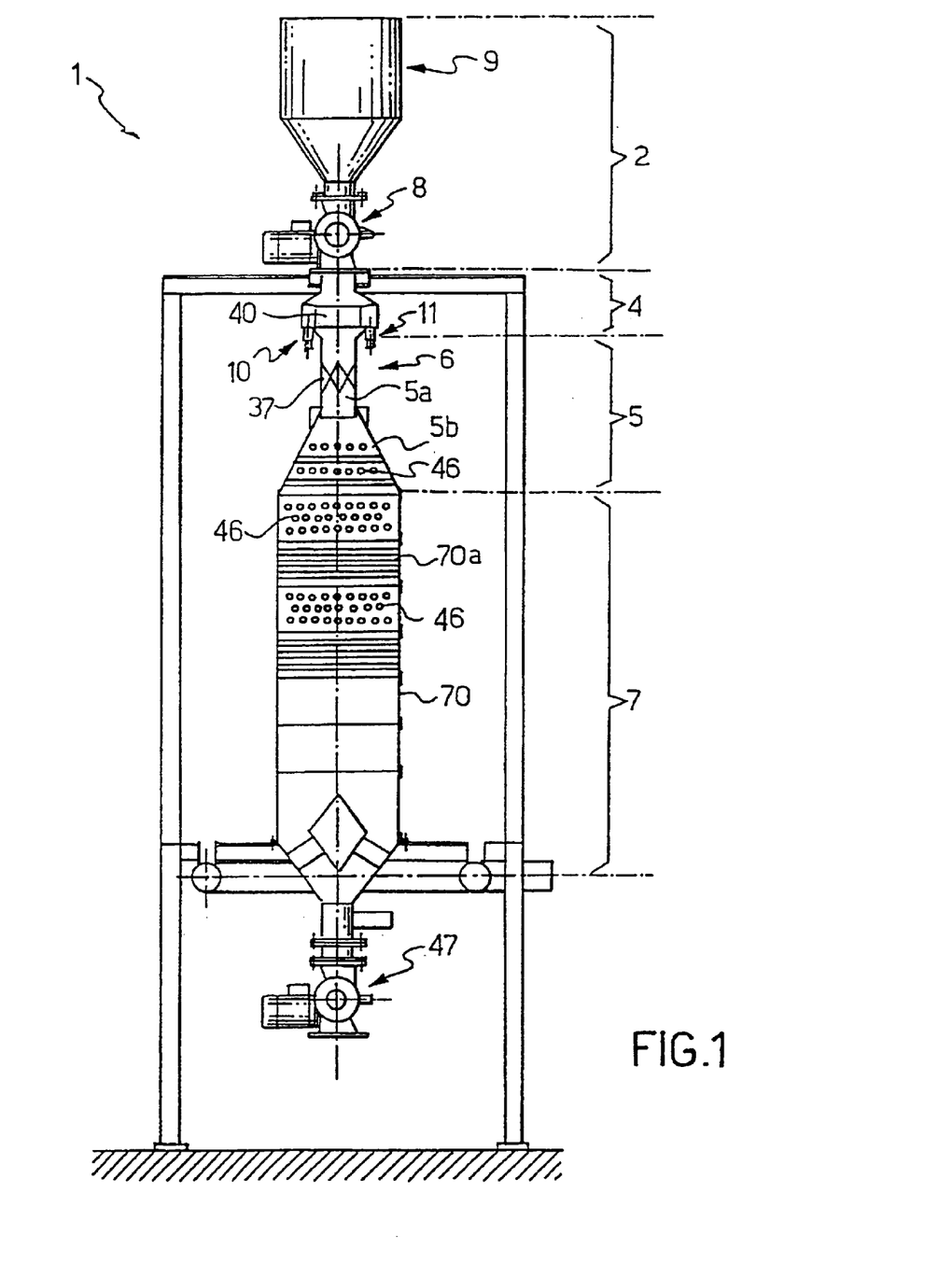
FIG. 1 shows a front view of an embodiment of the apparatus of the invention.

With reference to FIG. 1, an apparatus according to the invention for introducing in continuous a substance in liquid phase, for example dicumylperoxide heated to the temperature of 65° C., into plastics granules, for example low density polyethylene, is globally indicated by 1.

Apparatus 1 comprises a feeding section 2 of the granules made of polyethylene provided with means 3 for feeding said granules in a substantially continuous manner to a spraying section 4, including a spraying chamber 40 placed downstream of the feeding section 2 and provided in turn with means 10 for spraying dicumylperoxide on the polyethylene granules.

The apparatus 1 further comprises a mixing zone 5, including substantially static mixing means 6, placed downstream of the spraying chamber 40 and at least one drying zone 7 including a drying chamber 70, placed downstream of the mixing zone 5 and adapted to receive a predetermined amount of polyethylene granules coated by dicumylperoxide for a predetermined and suitable time to allow the complete absorption of the dicumylperoxide by the granules.

The granules fed to the apparatus by the feeding section 2, flow through the spraying zone 4, the mixing zone 5 and the drying zone 7 only thanks to the gravity force, and are discharged to the outside of apparatus 1 by means of a dosing valve 47 placed downstream of the drying chamber 70.

The feeding means 3 of the polyethylene granules comprises a storage tank 9 of the granules and a dosing valve 8, for example a star feeder valve known per se, adapted to feed in a substantially continuous manner the polyethylene granules. A suitable synchronism between the valves 8 and 47 allows the complete filling of the apparatus 1 avoiding the formation of dead zones with undesired accumulation of dicumylperoxide.

Figure 2:
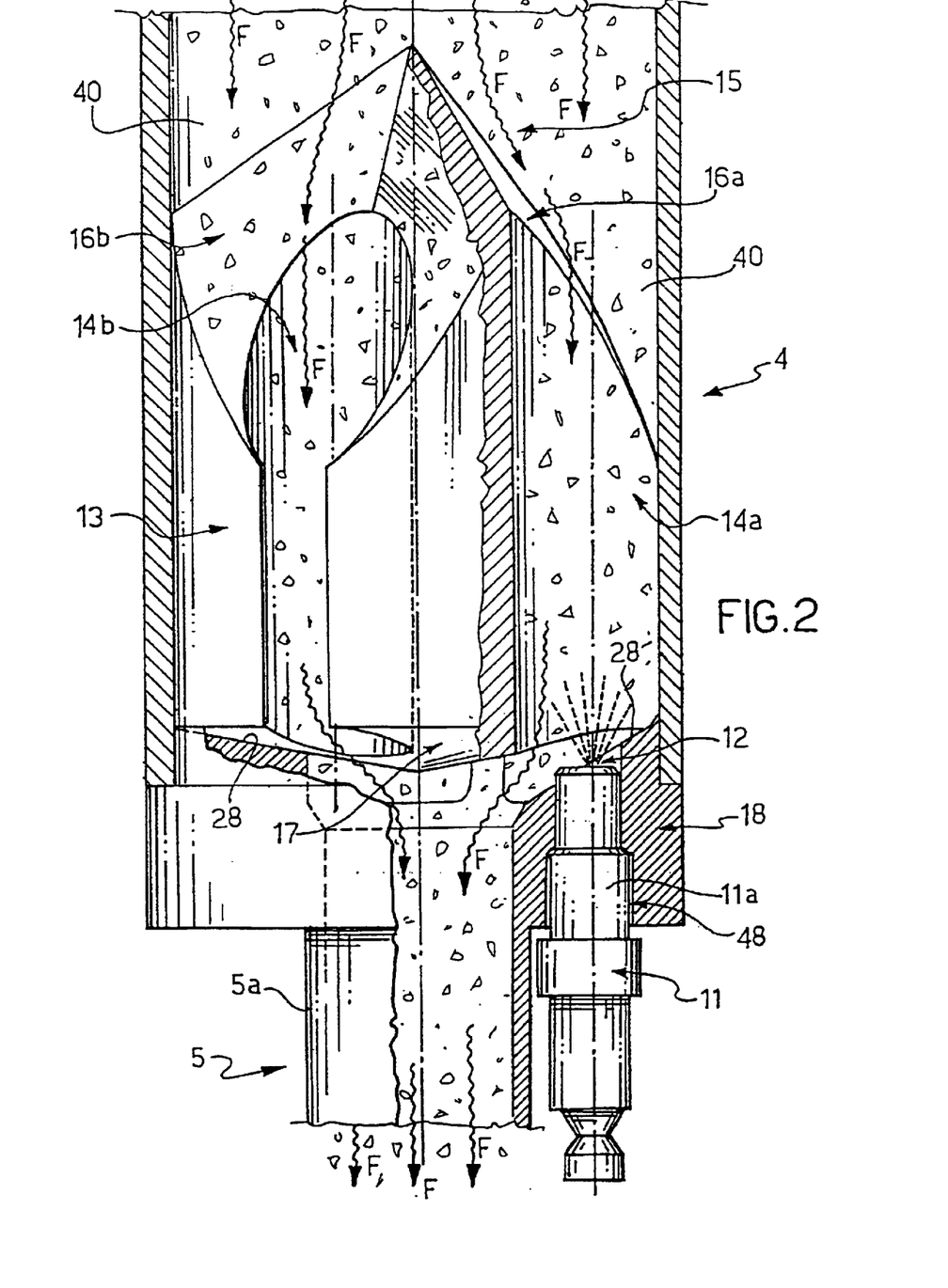
FIG. 2 shows a view in an enlarged scale and in partial longitudinal section of the spraying chamber of the apparatus of FIG. 1.

The spraying chamber 40 comprises a shaped insert 13, fixed within the chamber itself at a predetermined height and having a shape mating therewith, which defines respective flowpaths for the granules in the chamber 40 in front of means 10 adapted to spray dicumylperoxide in liquid phase onto the polyethylene granules.

Advantageously, the insert 13 is substantially cylindrical and is provided with an upper end 15 shaped substantially as a pyramid with triangular base and having respective concave faces 16a, 16b and 16c adapted to convey the granules flow within respective open channels 14a, 14b and 14c, thus avoiding undesired accumulation of granules, and a lower end 17 of conical shape adapted to eliminate the formation of dead zones below the same insert 13.

The means 10 adapted to spray dicumylperoxide in liquid phase onto the polyethylene granules comprises three structurally identical injectors, only one of which, indicated by reference number 11, is shown in FIG. 2, each having a nozzle 12 supported within the spraying chamber 40 by means of a screwing engagement of an externally threaded portion 11a of the injector 11 with a threaded hole 48 formed in a flange 18 adapted to close the spraying chamber 40 in its lower part.

Advantageously, the flange 18 is provided in its upper part with an annular face 28 inclined as a funnel, adapted to facilitate the granules sliding in radial direction from each of the aforesaid open channels 14a, 14b and 14c towards the inlet of the mixing zone 5 supported below.

The flange 18 is therefore adapted to support the injectors 11 below the insert 13 and parallel to a longitudinal axis of the spraying chamber 40.

Preferably, the injectors 11 are of the throttled pin type, known per se, and are angularly offset from one another by an angle of 120°. The injectors 11, furthermore, are oriented in such a way as to spray dicumylperoxide in said open channels 14a, 14b and 14c (not shown) in countercurrent to the flow of the polyethylene granules indicated by arrows F in FIG. 2.

Figure 3:
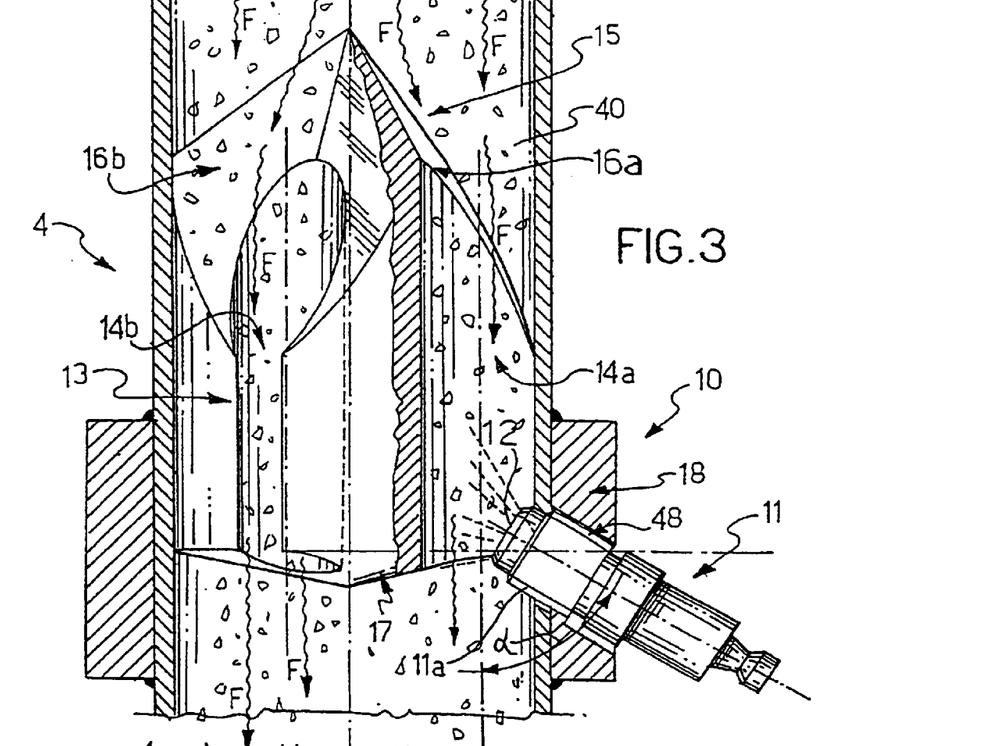
FIG. 3 shows a view in an enlarged scale and in partial longitudinal section of a second embodiment of the spraying chamber of the apparatus of FIG. 1 along line A—A of FIG. 4.
Figure 4:
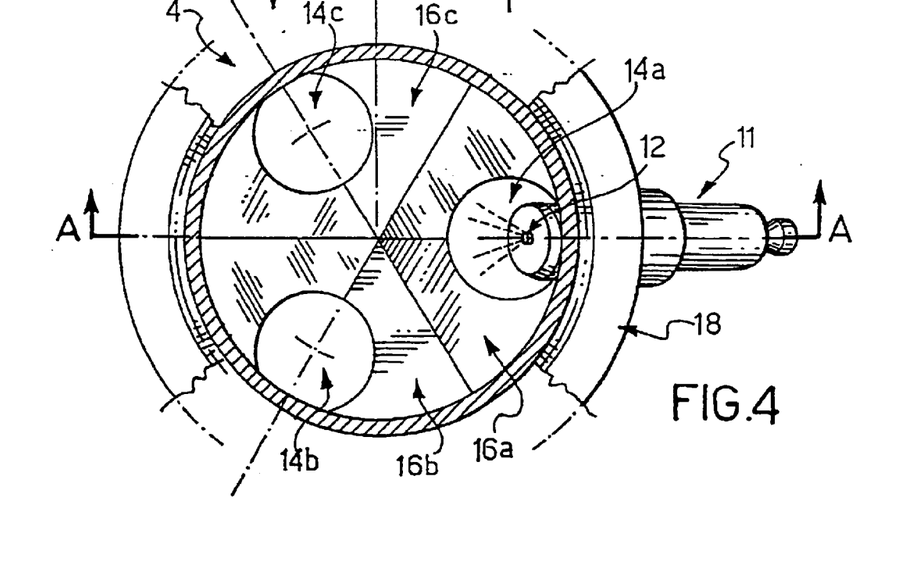
FIG. 4 shows a top view and in partial cross-section of the spraying chamber of FIG. 2.

Alternative embodiments of the spraying chamber 40 are illustrated in FIGS. 3 and 4 wherein structural or functional elements equivalent to those previously illustrated are indicated by the same reference numerals.

In particular, in FIGS. 3 and 4 the flange 18 is externally fixed to the spraying chamber 40 at a lower end of the insert 13, whereas each of the injectors 11 forms an angle α equal to about 60° with a longitudinal axis of the aforesaid chamber. The injectors 11, furthermore, are oriented in such a way as to spray dicumylperoxide in the open channels 14a, 14b and 14c, axially formed in the insert 13 at the aforesaid injectors 11, in countercurrent to the continuous flow of the granules indicated by arrows F in FIG. 2.

Figure 5:
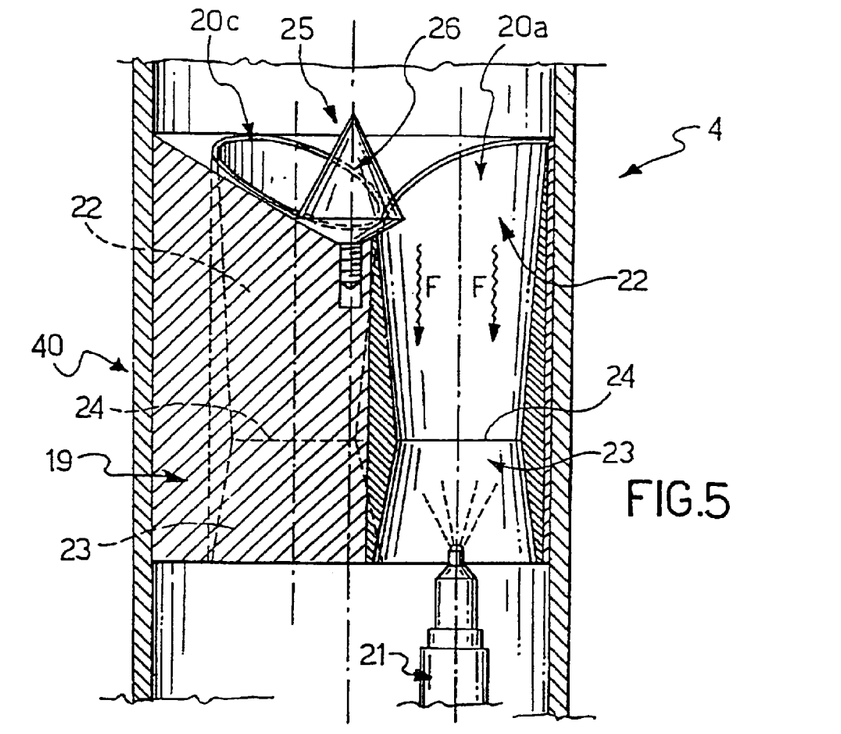
FIG. 5 shows a view in an enlarged scale and in longitudinal section of a third embodiment of the spraying chamber of the apparatus of FIG. 1 along line B—B of FIG. 6.

In the embodiment shown in FIG. 5, the spraying chamber 40 comprises a shaped insert 19, fixed within the chamber itself at a predetermined height thereof and having a shape mating therewith, having a similar function as the previously described insert 13.

The insert 19 comprises three closed channels 20a, 20b, 20c, identical with one another, axially formed within the insert 19 and defining respective flowpaths of the granules in front of the means 10 adapted to spray dicumylperoxide in liquid phase onto the polyethylene granules.

Figure 6:
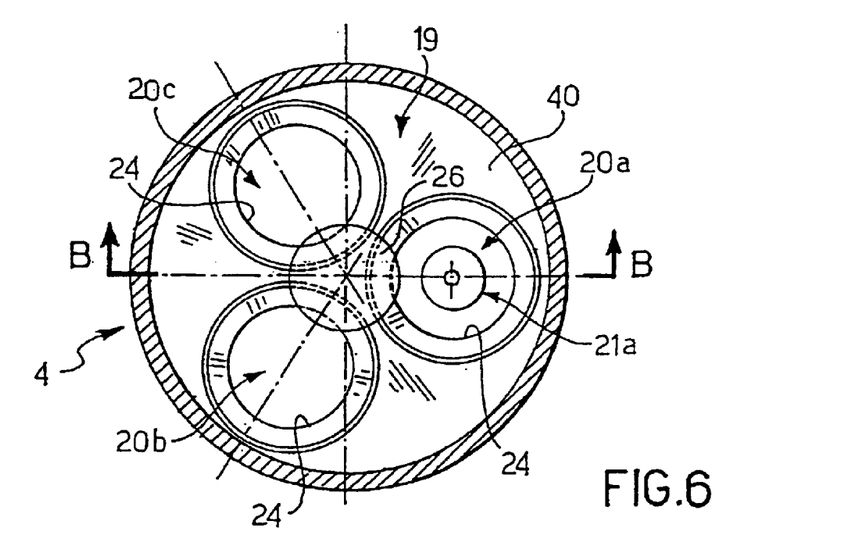
FIG. 6 shows a top view and in partial cross-section of the spraying chamber of FIG. 5.

Such means 10 comprises three structurally identical injectors, only one of which, indicated by numeral 21, is shown in FIGS. 5 and 6, supported within the spraying chamber 40 downstream of the insert 19 by means of supporting means conventional per se, for example an arm (not shown).

Preferably, the injectors 21 are of the hole-type and are angularly offset from one another by an angle of 120°.

In particular, such injectors 21 extend parallel to a longitudinal axis of the spraying chamber 40 and are oriented in such a way as to spray dicumylperoxide in the aforesaid closed channels 20a, 20b and 20c in countercurrent to the continuous flow of the granules indicated by arrows F in FIG. 5.

Preferably, each of the aforesaid channels comprises opposite upper and lower end portions 22, 23, respectively, substantially frustoconical and joined at a restricted section or throat 24.

Advantageously, the restricted section or throat 24 has a size corresponding to the maximum opening of the spraying cone of the injectors 21 supported below, so that the advancing front of the granules flowing in the channels 20a, 20b and 20c is uniformly hit by the jet of dicumylperoxide.

Advantageously, the lower portion 23 is designed in such a way as to have an ever increasing flowing section of the granules in order to obtain a decrease of flow velocity of the granules down to a suitable value for effectively carrying out the subsequent mixing step.

The insert 19 is substantially cylindrical and comprises a substantially funnel-shaped upper end 25, centrally provided with a substantially conical deflector 26 adapted to facilitate the splitting of the polyethylene granules in the channels 20a, 20b and 20c.

Figure 7:
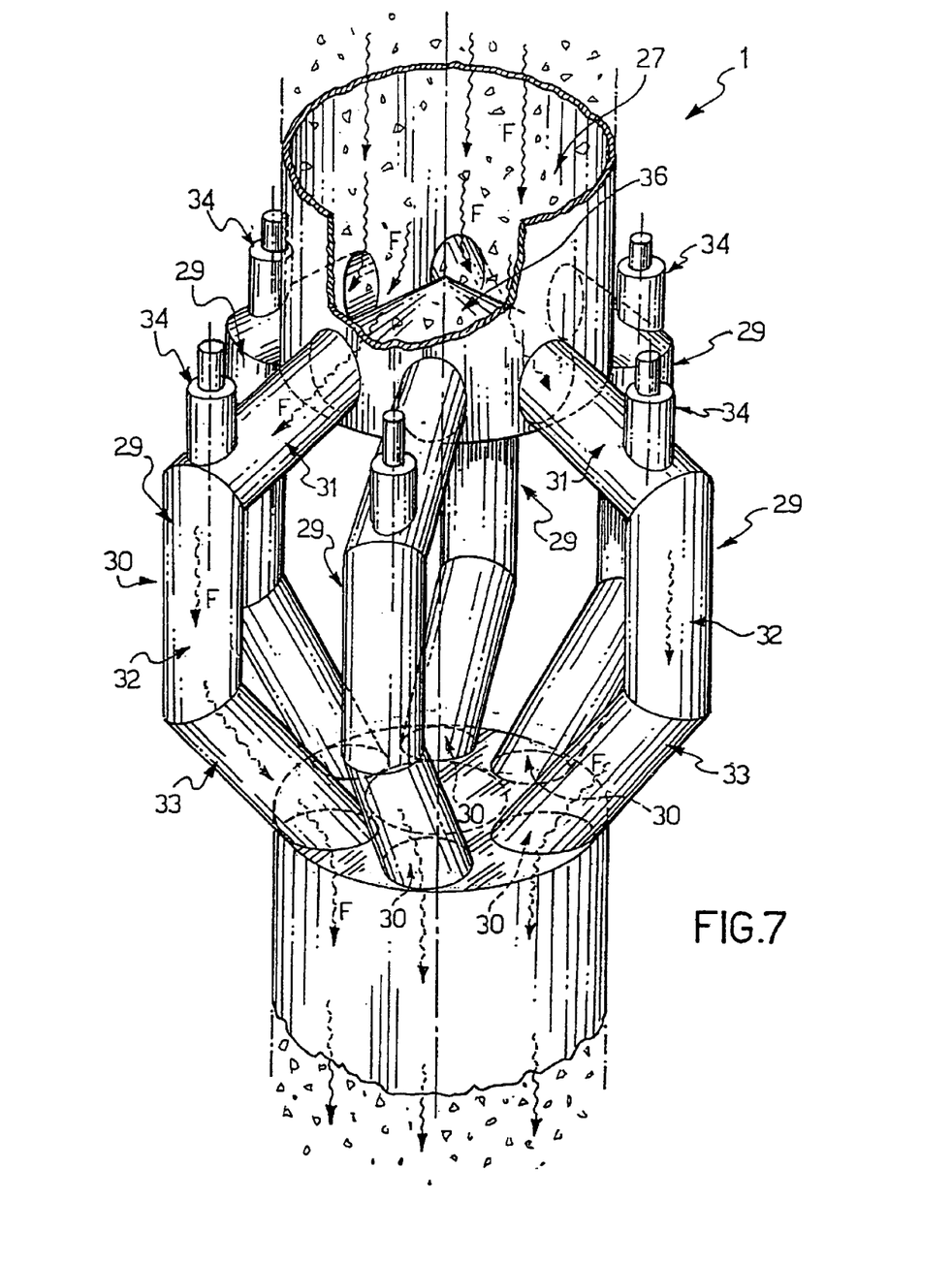
FIG. 7 shows a perspective view in an enlarged scale and in partial section of an alternative embodiment of the apparatus of FIG. 1 including a plurality of spraying chambers.
Figure 8:
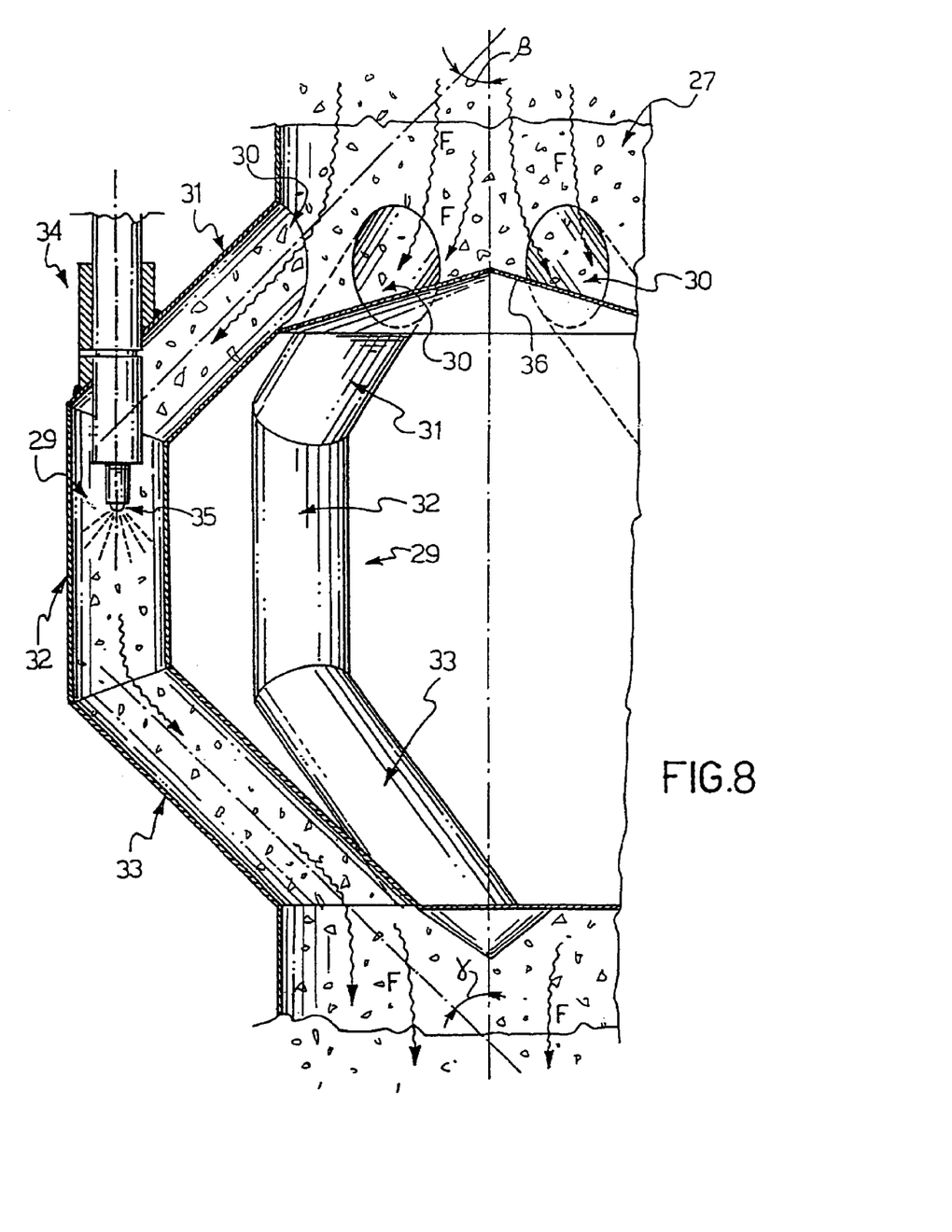
FIG. 8 shows a view in a further enlarged scale and in partial longitudinal section of the spraying chambers of FIG. 7.

In FIGS. 7 and 8, an alternative embodiment of the apparatus of the invention is shown, comprising a plurality of spraying chambers, all indicated by 29, extending in parallel with one another and defined in respective ducts all indicated by 30, extending between the feeding section 2 and the mixing zone 5.

The aforesaid ducts 30 comprise a first portion 31 forming an angle β equal to about 45° with the longitudinal axis of the apparatus 1, a second portion 32 substantially parallel to the aforesaid longitudinal axis and a third portion 33 forming an angle γ equal to about 45° with the aforesaid longitudinal axis and oriented in an opposite way to the first portion 31 (see FIG. 8).

In particular, the spraying chambers 29 are respectively defined in each of the second portions 32.

According to this embodiment, the apparatus 1 comprises six injectors 34, preferably of the hole-type, having respective nozzles 35 coaxially supported within the aforesaid spraying chambers 29. In particular, the injectors 34 are oriented in such a way as to spray dicumylperoxide cocurrently with the continuous flow of granules indicated by the arrows F of FIGS. 7 and 8.

In order to avoid undesired accumulation of granules upstream of the ducts 30, the apparatus 1 is provided with a feeding chamber 27 of the granules which has a substantially conical bottom 36 wherein the ducts 30 open. In this way, the portions 31 convey the granules coming from the chamber 27 towards the spraying chambers 29 provided downstream thereof.

In the embodiment illustrated in FIG. 1, the mixing zone 5 comprises a first substantially cylindrical upper mixing chamber 5a defined right downstream of the spraying chamber 40 and a second substantially frustoconical lower mixing chamber 5b, defined right upstream of the drying chamber 70.

Figure 9:
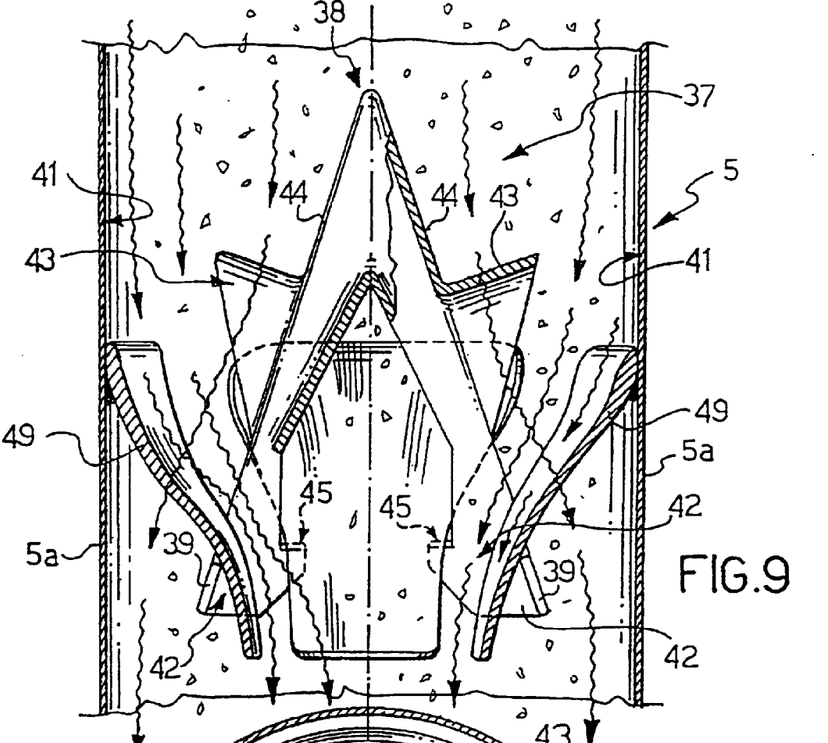
FIG. 9 shows a view in an enlarged scale and in partial longitudinal section of an upper mixing chamber of the mixing zone of the apparatus of FIG. 1, along line C—C of FIG. 10.
Figure 10:
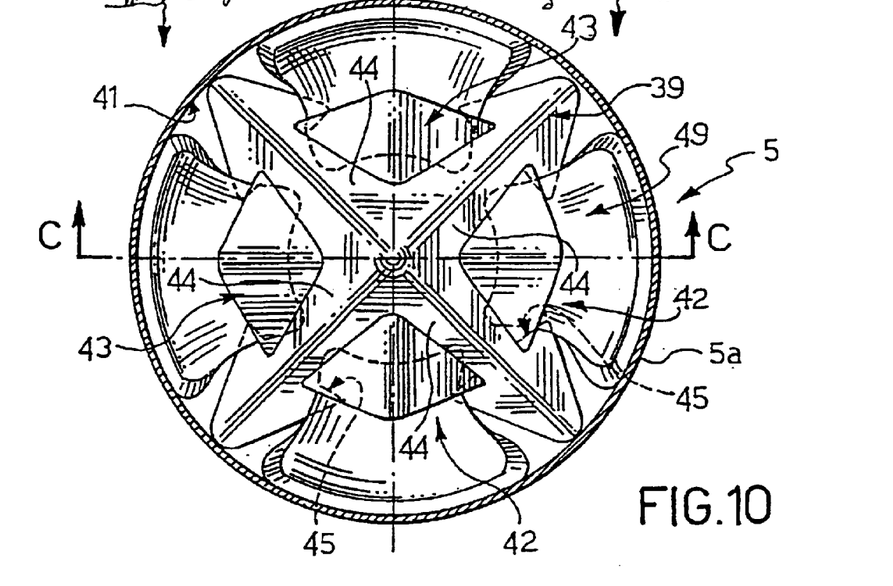
FIG. 10 shows a top view and in partial cross-section of the mixing chamber of FIG. 9.

In FIG. 9 a preferred embodiment of the upper mixing chamber 5a of the mixing zone 5 is shown. In such embodiment, the substantially static mixing means 6 comprises a static mixer 37 including:

i) a substantially pyramidal central body 38 having a square base and respective concave faces 44 having a substantially V-shaped profile, ii) a plurality of supporting legs 39 downwardly extending from each edge of the central body 38, and iii) a plurality of substantially curvilinear baffles 49 extending between the inner wall 41 of the mixing chamber 5a and respective openings 42 for the flow of the granules, defined between the supporting legs 39 of the central body 38.

Advantageously, the central body 38 is provided with a plurality of deviating wings 43, substantially shaped as turned V, projecting from each face 44 of the central body 38 which, together with the central body 38, allow to deviate the granules flow coming from the central zone of the spraying chamber 40 towards the peripheral zone of the mixing chamber 5a.

The supporting legs 39, adapted to support the central body 38 at a predetermined distance from the wall 41, essentially consist of V-shaped section bars provided at a free end thereof with a pair of substantially hook-shaped wings 45 which constitute respective supporting members for the baffles 49.

Advantageously, the baffles 49 have a flex-forming profile so as to be jointed to the inner wall 41 at one end and to lean on the wings 45 of the legs 39 at the opposite end. In this way, the granules coming from the peripheral zone of the spraying chamber 40 are effectively deviated towards the central zone of the mixing zone 5.

Advantageously, the baffles 49 are tapered along their width in order to drive in optimal way the granules towards the central zone of the mixing zone 5.

In an embodiment, the central body 38 may be internally provided with a downwardly oriented substantially conical element (not shown) adapted to drive the flow of granules towards the drying chamber 70 and to avoid the formation of a dead zone with an undesired accumulation of granules below the central body 38.

According to an alternative embodiment, also not shown, the substantially static mixing means 6 may comprise two superimposed groups of mixing bars substantially arranged perpendicularly with one another and supported in the upper mixing chamber 5a of the mixing zone 5.

Preferably, the aforesaid mixing bars have a substantially rhomb-shaped cross-section in order to avoid the formation of air zones below the same and which could be a source of danger because of a possible accumulation of dicumylperoxide.

According to a preferred embodiment of the apparatus 1 shown in FIG. 1, the substantially static mixing means 6 comprises the above described static mixer 37, supported within the upper mixing chamber 5a of the mixing zone 5 and a plurality of superimposed groups of mixing bars 46, arranged substantially perpendicularly with one another and housed downstream of the static mixer 37 in the lower mixing chamber 5b of the mixing zone 5.

Advantageously, the mixing bars 46 allow to mix groups of granules close to one another and therefore promote the improvement at local level of the distribution of dicumylperoxide on the surface of the granules already obtained by means of the static mixer 37.

According to a preferred embodiment of the apparatus 1, the distribution of dicumylperoxide on the surface of the granules may be further improved by providing in an upper portion 70a of the drying chamber 70 an additional plurality of mixing bars 46 as illustrated in FIG. 1.

Preferably, the bars 46 are arranged in groups of rows superimposed and offset from one another, the groups being orientated perpendicularly with one another.

Figure 11:
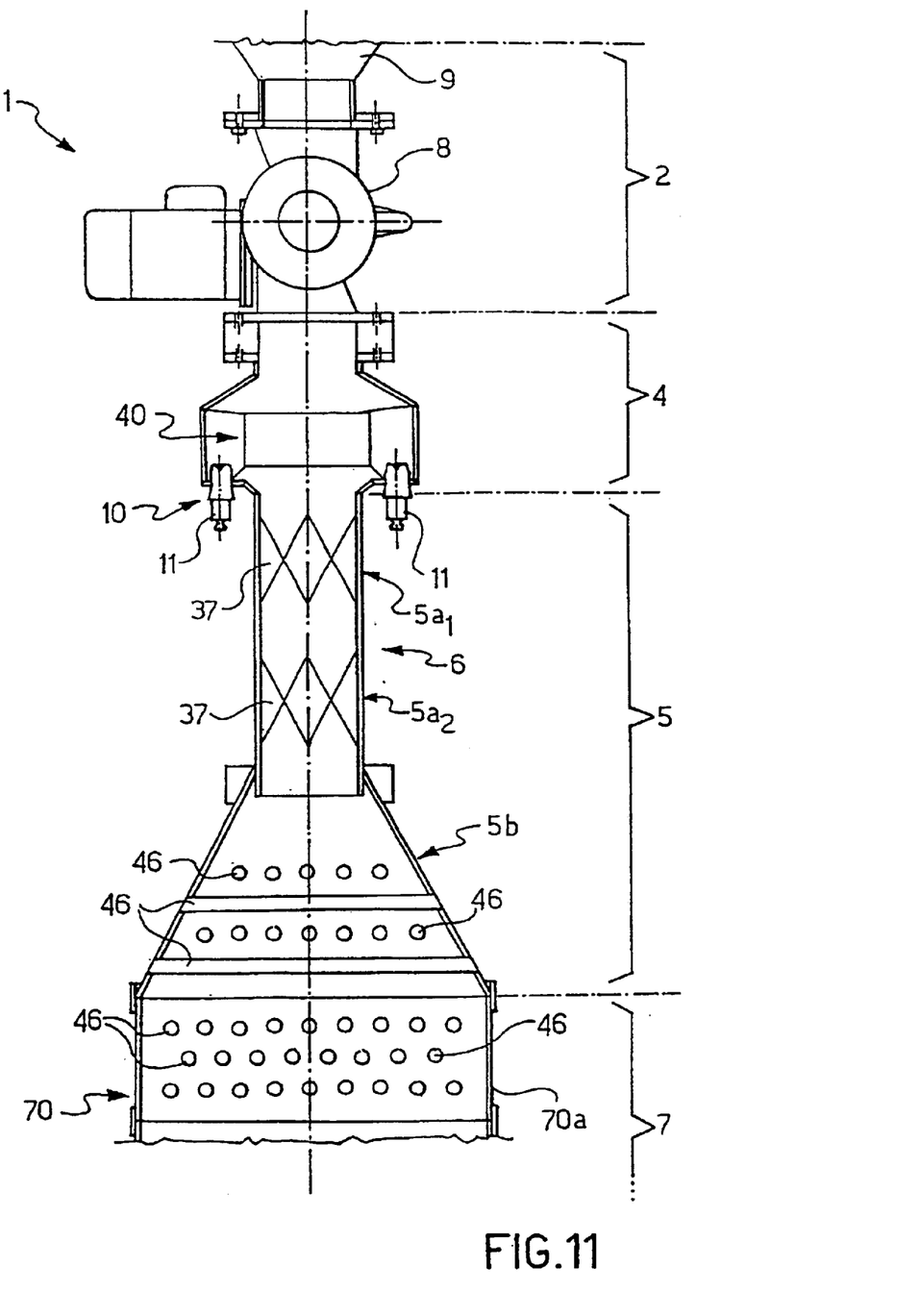
FIG. 11 shows a front view in an enlarged scale of some details of an alternative embodiment of the apparatus of the invention, comprising two mixing chambers arranged in series one after the other.

According to a particularly preferred embodiment of the invention, illustrated in FIG. 11, the apparatus 1 comprises a spraying chamber 40 according to the embodiment illustrated in detail in FIG. 2 and a mixing zone 5 including two mixing chambers $5a_1$ and $5a_2$ arranged in series one after the other and in each of which a static mixer 37 is supported.

Similarly to what has been disclosed above with reference to the embodiment illustrated in FIG. 1, the mixing zone 5 of the apparatus 1 comprises downstream of the chamber $5a_2$ an additional mixing chamber 5b in which a plurality of superimposed groups of bars 46 is supported.

Finally, in each of the above illustrated embodiments, the apparatus 1 may further comprise a soaking zone for example consisting of a thermostated storage bin, conventional per se not illustrated, supported downstream of the drying chamber 70 in a way known per se.

With reference to the above described apparatus 1, a way of carrying out the method of the present invention will now be illustrated.

In a first step, such method provides to feed a substantially continuous flow of granules made of polyethylene, having an inlet temperature of about 75°–80° C., into the spraying chamber 40. In particular, such feeding step is carried out by means of the dosing valve 8 supported downstream of the storage tank 9 of the aforesaid granules.

The polyethylene granules, withdrawn from the tank 9 in a predetermined amount by means of the valve 8, flow in continuous thanks to the gravity force towards the spraying chamber 40, in which the following step of spraying dicumylperoxide on the granules is carried out.

In case of the apparatus shown in FIG. 1 such working step is carried out by means of the injectors 11 supported externally to the spraying chamber 40, as shown in FIG. 2.

Advantageously, the method of the invention provides the step of splitting the continuous flow of granules into a plurality of streams flowing in continuous in respective flowpaths defined in the spraying chamber 40 in front of each injector 11.

Advantageously, such step of splitting the granules flow is carried out by means of the insert 13 supported at a predetermined height within the spraying chamber 40 and including the open channels 14a, 14b and 14c, axially formed therein.

The granules partially or totally coated with dicumylperoxide in the spraying chamber 40 flow thanks to the gravity force in the mixing zone 5.

In the mixing zone 5, the granules are flown through the previously described substantially static mixing means 6, so as to undergo to mixing by means of the latter.

In particular, such mixing step is carried out by means of a first mixing of the granules, carried out at a macroscopic level by means of the static mixer 37 supported in the upper mixing chamber 5a of the mixing zone 5, which simultaneously allows to deviate the granules flow coming from the central zone of the spraying chamber 40 towards the peripheral zone of the mixing chamber 5a and the flow coming from the peripheral zone of the spraying chamber 40 towards the central zone of the mixing chamber 5a, and a second mixing carried out at a local level by means of the mixing bars 46 housed in the lower mixing chamber 5b of the mixing zone 5.

In an alternative embodiment, and in order to optimize the introduction of dicumylperoxide into the polyethylene granules, the method according to the invention provides to submit the granules leaving the spraying step to a first mixing step carried out by passing through the static mixer 37, then to a second spraying step and to a second mixing step by means of the static mixer 37 and finally to the mixing step carried out at local level by means of the mixing bars 46.

The granules so obtained from the mixing step, are submitted to a drying step within the drying chamber 70 in which they flow at an extremely low velocity, in the order of about 6–10 cm/min, in such a way as to stay for a time equal to about 60–80 minutes ensuring the complete absorption of dicumylperoxide by the granules.

Advantageously, the distribution of dicumylperoxide on the granules is further improved thanks to the groups of bars 46 housed in the upper portion 70a of the drying chamber 70 as shown in FIG. 1.

All the working steps previously described are carried out keeping within the apparatus 1 a maximum temperature of 75° C. compatible with the use of dicumylperoxide in safety conditions.

In order to optimize the diffusion of dicumylperoxide within the granules and hence to equalize its final distribution, the mass of granules withdrawn downstream of the apparatus 1 is further submitted to a soaking step carried out keeping the granules at a predetermined temperature and for a predetermined time (typically at 75° C. for about 16 hours in case of the polyethylene/dicumylperoxide system herein considered) within a thermostated storage bin conventional per se.

With reference to what has been described above, examples adapted to illustrate the method and the apparatus of the invention will be provided hereinbelow, by way of non limitative indication.

EXAMPLE 1

Invention

According to an embodiment of the invention, an experimental apparatus was realized for introducing in continuous liquid dicumylperoxide into granules made of low density polyethylene (LDPE), comprising the spraying chamber 40 according to the embodiment illustrated in FIG. 2.

Such spraying step was carried out by feeding dicumylperoxide at a temperature of about 65° C. to the injectors and by injecting dicumylperoxide onto the polyethylene granules in an intermittent way with a frequency of about 800 strikes/min and at a pressure of about 150 bar.

These granules flew in continuous in the spraying chamber 40 at a velocity of about 600 cm/min. The values of frequency and pressure allowed the nebulization of dicumylperoxide in a plurality of droplets having a mean diameter comprised between 10 and 500 μm. The granules partially or totally coated with dicumylperoxide in the spraying chamber 40 then flew by gravity into the mixing zone 5 comprising two static mixers 37 placed in series downstream of the spraying chamber 40 in respective chambers $5a_1$ and $5a_2$ and a plurality of mixing bars 46 housed in the chamber 5b of the mixing zone 5 and in the drying chamber 70 illustrated in FIG. 1, respectively.

Globally, the granules flew through the mixing zone 5 at a velocity equal to 60 cm/min.

The granules so obtained by the mixing step were submitted to a drying step within the drying chamber 70 in which they flew at a very low velocity, equal to about 8 cm/min, so as to stay for a time equal to about 60 minutes, ensuring the complete absorption of dicumylperoxide by the granules which came substantially dried out of the drying chamber 70.

All the working steps previously described were carried out keeping within the apparatus employed a maximum temperature of 75° C. compatible with the use of dicumylperoxide in safety conditions.

The granules leaving the drying chamber 70 were then submitted to a final soaking step in order to equalize the distribution of dicumylperoxide in each of the LDPE granules, distribution which was carried out in a thermostated storage bin at 75° C. for a total duration of about 16 hours.

In order to evaluate the degree of dispersion and of homogeneity of dicumylperoxide in the polyethylene granules, the granules so obtained were submitted to differential scanning calorimetry tests for which the commercially available calorimeter DSC30 by Mettler provided with the respective Software Mettler DC11 was used.

In particular, 15 granules impregnated within the above described apparatus and having more or less similar cylindrical shape were selected among the same; the central section of each of the aforesaid 15 granules was extracted, weighed, closed within a capsule and placed inside the measurement instrument.

As reference material, essentially in order to balance the initial heat pulse, a sample of alumina was used in the same amount of the impregnated polyethylene, this also being closed within a capsule and placed inside the measurement instrument.

The differential scanning calorimetry test consists in providing heat to the two samples until decomposition and cross-linking of the peroxide used as additive takes place. From the measurement of the heat produced by this reaction it is possible to determine the amount of peroxide in the sample of polyethylene.

The tests were carried out by heating the samples, kept at atmospheric pressure inside the instrument by injection of a suitable gas, from the temperature of 20° C. to the temperature of 280° C., at a constant heating rate equal to 10° C./min.

In particular, the data obtained from the tests are representative of the variation of the specific enthalpy of the sample of impregnated polymer as a function of the heat supplied to the sample itself.

The peroxide decomposition and cross-linking reaction bring about an increase of the specific enthalpy at about the temperature at which this reaction occurs. From the integration of the area corresponding to the exothermic reaction it is possible, therefore, to derive the amount of peroxide present in the sample.

The specific enthalpy data, expressed as average of the tests carried out on the 15 samples, of variance ($\sigma$) and of error ($2\sigma/\bar{x}$) are reported in the following Table I.

EXAMPLE 2

Invention

According to a further embodiment of the invention, an impregnating apparatus was realized similar to that described in preceding Example 1, except that the spraying chamber 40 was realized according to the embodiment illustrated in FIGS. 3 and 4 and the mixing zone 5 consisted in this case of only one mixing chamber 5a upstream of the mixing chamber 5b wherein four superimposed groups of bars 46 were supported.

More particularly, the spraying chamber 40 comprised a shaped insert 13 and three injectors 11, of the throttled-pin type, having a nozzle 12 supported within the same chamber and forming an angle α equal to about 60° with respect to a longitudinal axis of apparatus 1.

Furthermore, the apparatus 1 included the mixing zone 5 and the drying chamber 70 illustrated in FIG. 1.

The data and the ways of carrying out the process are the same of the preceding Example 1.

The results of the calorimetry tests carried out on the samples similarly impregnated as described in preceding Example 1, are reported in the following Table I.

EXAMPLE 3

Invention

According to a further embodiment of the invention, a test apparatus was realized for introducing in continuous liquid dicumylperoxide into granules made of low density polyethylene comprising a spraying chamber 40 according to the embodiment illustrated in FIGS. 3 and 4 and two static mixers 37 placed in series one after the other, the mixers being each supported in a respective chamber $5a_1$ and $5a_2$ of the mixing zone 5 and a plurality of mixing bars 46 placed downstream of the last static mixer 37 housed in the chamber 5b of the mixing zone 5, as illustrated in FIG. 11.

Each spraying chamber was provided with three injectors 11, of the throttled-pin type. The data and the ways of carrying out the process are the same of the preceding Example 1, except that dicumylperoxide was sprayed at a frequency equal to about 1400 strikes/min.

Downstream of the plurality of mixing bars 46 a drying chamber is provided, in which the granules were allowed to stay for a time equal to 60 minutes.

The samples of impregnated polyethylene obtained from this test apparatus were submitted to differential scanning calorimetry tests according to the procedures described in preceding Example 1.

The test results are reported in following Table I.

EXAMPLE 4

Invention

According to a further embodiment of the invention, a test apparatus was realized as described in preceding Example 2, except for the presence of a total of two static mixers 37 placed in series downstream of the spraying chamber 40 in respective chambers $5a_1$ and $5a_2$ of the mixing zone 5, as illustrated in FIG. 11.

Similarly to the preceding examples, the samples obtained after impregnation were submitted to differential scanning calorimetry tests as described in preceding Example 1. The data so obtained are reported in Table I.

EXAMPLE 5

Invention

According to a further embodiment of the invention, a test apparatus was realized comprising a spraying chamber 40 according to the embodiment illustrated in FIGS. 5 and 6, including a shaped insert 19 and three injectors 21 of the standard throttled-pin type, supported within the spraying chamber 40 downstream of the insert 19 in parallel to a longitudinal axis of the apparatus 1, a mixing zone 5 comprising two static mixers 37 placed in series downstream of the spraying chamber 40 in respective chambers $5a_1$ and $5a_2$ and a plurality of mixing bars 46 respectively housed in the chamber 5b of the mixing zone 5 and in the drying chamber 70 illustrated in FIG. 1.

The data and the ways of carrying out the process are the same of preceding Example 1.

Similarly to the preceding examples, the impregnated samples were submitted to differential scanning calorimetry tests according to the procedures described in preceding Example 1. The tests results are reported in Table I.

EXAMPLE 6

Invention

According to a further embodiment of the invention, a test apparatus was realized comprising a plurality of spraying chambers according to the embodiment illustrated in FIGS. 7 and 8, including six injectors, of the hole type, having respective nozzles coaxially supported within the spraying chambers, a mixing zone comprising two static mixers supported in series in respective chambers $5a_1$ and $5a_2$ placed downstream of the spraying chambers, a plurality of mixing bars housed downstream of the static mixers and a drying chamber similar to that illustrated in FIG. 1. The data and ways of carrying out the process are the same of preceding Example 1.

Similarly to the preceding examples, the impregnated samples were submitted to differential scanning calorimetry tests according to the procedures described in preceding Example 1. The tests results are reported in Table I.

From an analysis of the data reported in Table I, it is clear that the injectors parallel to the longitudinal axis of the apparatus allow to obtain a statistically better distribution of the substance in liquid phase among the granules than the arrangement with inclined injectors.

Furthermore, the presence of two static mixers in series contributes to improve the statistical distribution of the substance in liquid phase among the granules in particular in connection with the mixing bars (Examples 1 and 5).

With respect to the tests carried out, it has been detected that the aforesaid improvement of the statistical distribution of the substance in liquid phase among the granules is independent from the fact that the final soaking step is carried out after the drying step. The soaking step, in fact, only acted to equalize the distribution of the substance in liquid phase absorbed within each plastics granule.

The apparatus and the method of the invention therefore allow to introduce additives of different kind into the plastics granules, obtaining a statistical distribution of the same additives among the granules, which is essentially comparable to that of the prior art, with the further considerable advantage of avoiding in a substantially complete way the generation of plastics dust, thanks to the exclusion of moving mechanical members adapted to cause rubbing between the granules themselves.

TABLE I

|       | DSC Mean [J/g] | Variance | Error |
|-------|----------------|----------|-------|
| Ex. 1 | 16.6           | 1.09     | 0.13  |
| Ex. 2 | 16.5           | 1.55     | 0.19  |
| Ex. 3 | 15.3           | 1.45     | 0.19  |
| Ex. 4 | 13.9           | 1.31     | 0.19  |
| Ex. 5 | 18.2           | 1.41     | 0.15  |
| Ex. 6 | 21.2           | 2.10     | 0.20  |

What is claimed is:

1. Method for continuously introducing a substance in liquid phase into plastics granules comprising the steps of:
   a) feeding a substantially continuous flow of said plastics granules to at least one substantially static spraying chamber,
   b) spraying said substance in liquid phase onto the plastics granules continuously flowing within said spraying chamber, wherein said spraying step is carried out by a plurality of injectors supported within said spraying chamber by intermittently injecting the substance in liquid phase at an injection frequency comprised between 500 and 2000 strikes/mim and at an injection pressure comprised between 100 and 300 bar,
   c) passing the granules partially or totally coated by said substance in liquid phase continuously leaving the spraying chamber through substantially static mixing means supported in at least one mixing chamber provided downstream of said spraying chamber, so as to submit said granules to mixing,
   d) submitting the mixed granules so obtained to drying for a time sufficient to allow a substantially complete absorption of the substance in liquid phase by the granules.

2. Method according to claim 1, wherein said drying step is carried out in a drying chamber provided downstream of said mixing zone.

3. Method according to claim 2, wherein the plastics granules flow by gravity in a substantially Continuous manner through said spraying, mixing and drying chambers.

4. Method according to claim 1, wherein said spraying step is carried out by nebulizing said substance in liquid phase in a plurality of droplets having a mean diameter comprised between 10 and 500 $\mu$m.

5. Method according to claims 1, further comprising the step of splitting the continuous flow of plastics granules in a plurality of streams continuously flowing in respective flowpaths defined within the spraying chamber facing each of said injectors.

6. Method according to claim 1, wherein said steps a)–d) are carried out at a temperature comprising the temperature between the melting temperature of the substance in liquid phase and the minimum temperature between the softening temperature of the polymer to be impregnated and the temperature at which the substance in liquid phase starts to thermally deteriorate.

7. Method according to claim 1, wherein said spraying b) and mixing c) steps are carried out in a total time comprising between 10 and 40 minutes, and said drying step d) is carried out in a time comprising between 30 and 90 minutes.

8. Method according to claim 1, wherein said step c) of mixing the granules is carried out by passing the granules partially or totally coated by said substance in liquid phase through a static mixer comprising a substantially pyramidal central body supported by a plurality of supporting legs at a predetermined distance from an inner wall of said mixing chamber and a plurality of baffles extending between said inner wall and respective openings for the flow of the granules defined between said supporting legs, said mixer being adapted to deviate the granules flowing in the central zone of said mixing chamber towards the peripheral zone thereof and the granules flowing in the peripheral zone of the mixing chamber towards the central zone thereof.

9. Method according to claim 1 wherein said step c) of mixing the granules is carried out by passing the granules partially or totally coated by said substance in liquid phase through substantially static mixing means comprising a plurality of mixing bars.

10. Method according to claim 9 wherein said step c) of mixing the granules is carried out by passing the granules partially or totally coated by said substance in liquid phase through at least two superimposed groups of mixing bars arranged substantially perpendicularly with one other.

11. Method according to claim 2 or 3 wherein it further comprises the step of submitting the granules leaving the drying chamber to a soaking step in order to equalize the distribution of said substance in liquid phase into each of the plastics granules.

12. Method according to claim 1, wherein said plastics of the granules are polyethylene, ethylene-propylene copolymers, ethylene-propylene-diene terpolymers, ethylene-vinyl acetate (EVA) copolymers, or acrylic polyesters, wherein said acrylic polyesters are ethylene-methyl acrylate, ethylene-ethyl acrylate, ethylene-butyl acrylate, or mixture thereof.

13. Method according to claim 1, wherein said substance in liquid phase is a cross-linking agent, cross-linking co-agent, thermal stabilizer, light stabilizer, voltage stabilizer, UV stabilizer, processing aid, lubricant, flame retardant, plasticizer, nucleating agent, additive for water-treeing resistance, or mixtures thereof.

* * * * *